(12) United States Patent
Kim et al.

(10) Patent No.: US 11,139,120 B2
(45) Date of Patent: Oct. 5, 2021

(54) ENERGY STORAGE DEVICE MODULE HAVING A BALANCING CIRCUIT BOARD

(71) Applicant: LS MTRON LTD., Anyang-si (KR)

(72) Inventors: Sung Hyun Kim, Anyang-si (KR); Heui Soo Kim, Anyang-si (KR); Yong Hyeon Yoo, Anyang-si (KR)

(73) Assignee: LS MTRON LTD, Anyang-si (KR)

( * ) Notice: Subject to any disclaimer, the term of this patent is extended or adjusted under 35 U.S.C. 154(b) by 199 days.

(21) Appl. No.: 16/256,664

(22) Filed: Jan. 24, 2019

(65) Prior Publication Data

US 2019/0237271 A1    Aug. 1, 2019

(30) Foreign Application Priority Data

Jan. 29, 2018  (KR) .................. 10-2018-0010733
Nov. 29, 2018  (KR) .................. 10-2018-0150357

(51) Int. Cl.
  *H01G 11/76*  (2013.01)
  *H01G 11/10*  (2013.01)
  *H01G 11/82*  (2013.01)
  *H01G 11/78*  (2013.01)
  *H01G 2/06*   (2006.01)
  (Continued)

(52) U.S. Cl.
  CPC .............. *H01G 11/76* (2013.01); *H01G 2/06* (2013.01); *H01G 11/10* (2013.01); *H01G 11/78* (2013.01);
  (Continued)

(58) Field of Classification Search
  CPC ........ H01G 11/76; H01G 11/78; H01G 11/10; H01G 11/82; H01G 2/06; H01M 2010/4271; H01M 2/202; H01M 2/105
  See application file for complete search history.

(56) References Cited

U.S. PATENT DOCUMENTS 6,327,137 B1 * 12/2001 Yamamoto ............. H01G 9/155
                                                          361/216
2002/0066582 A1 *  6/2002 Zayatz ................ H01M 10/425
                                                           174/50
(Continued)

FOREIGN PATENT DOCUMENTS

EP      3032555 A1     6/2016
EP      3249670 A1    11/2017
(Continued)

OTHER PUBLICATIONS

European Search Report for related European Application No. 19153908.9; action dated Jun. 3, 2019; (8 pages).

*Primary Examiner* — David M Sinclair
(74) *Attorney, Agent, or Firm* — K&L Gates LLP

(57) ABSTRACT

An energy storage device module comprises: a plurality of energy storage devices having a first energy storage device and a second energy storage device; a connection member configured to connect a first external terminal of the first energy storage device and a second external terminal of the second energy storage device adjacent to the first energy storage device; and a circuit board including a hole that passes through the first external terminal of the first energy storage device, a board protrusion supported by a curling processed portion formed in a body case of the first energy storage device, a first conductive metal layer formed in a region adjacent to the hole and in contact with the connection member, and a second conductive metal layer formed in a region of the board protrusion and in contact with the curling processed portion.

18 Claims, 15 Drawing Sheets

(51) Int. Cl.
  *H02J 7/00* (2006.01)
  *H01M 10/42* (2006.01)
  *H01G 9/08* (2006.01)
  *H01M 50/213* (2021.01)
  *H01M 50/502* (2021.01)

(52) U.S. Cl.
  CPC ............ H01G 11/82 (2013.01); H02J 7/0014 (2013.01); *H01G 9/08* (2013.01); *H01M 10/4257* (2013.01); *H01M 50/213* (2021.01); *H01M 50/502* (2021.01); *H01M 2010/4271* (2013.01)

(56) References Cited

U.S. PATENT DOCUMENTS

| | | | |
|---|---|---|---|
| 2008/0160392 A1* | 7/2008 | Toya | H01M 10/48 429/90 |
| 2010/0159289 A1* | 6/2010 | Kim | H01M 10/42 429/7 |
| 2016/0189883 A1* | 6/2016 | Yoo | H01G 11/76 174/260 |
| 2018/0012707 A1* | 1/2018 | Lee | H01G 2/106 |

FOREIGN PATENT DOCUMENTS

| | | | | |
|---|---|---|---|---|
| JP | 2004265722 A * | 9/2004 | ............ | H01G 4/228 |
| JP | 2009188095 A | 8/2009 | | |
| JP | 2010157399 A | 7/2010 | | |
| KR | 102011098074 A | 9/2011 | | |
| KR | 20160090160 A | 7/2016 | | |
| WO | WO-2016117888 A1 * | 7/2016 | ............ | H01G 4/228 |

* cited by examiner

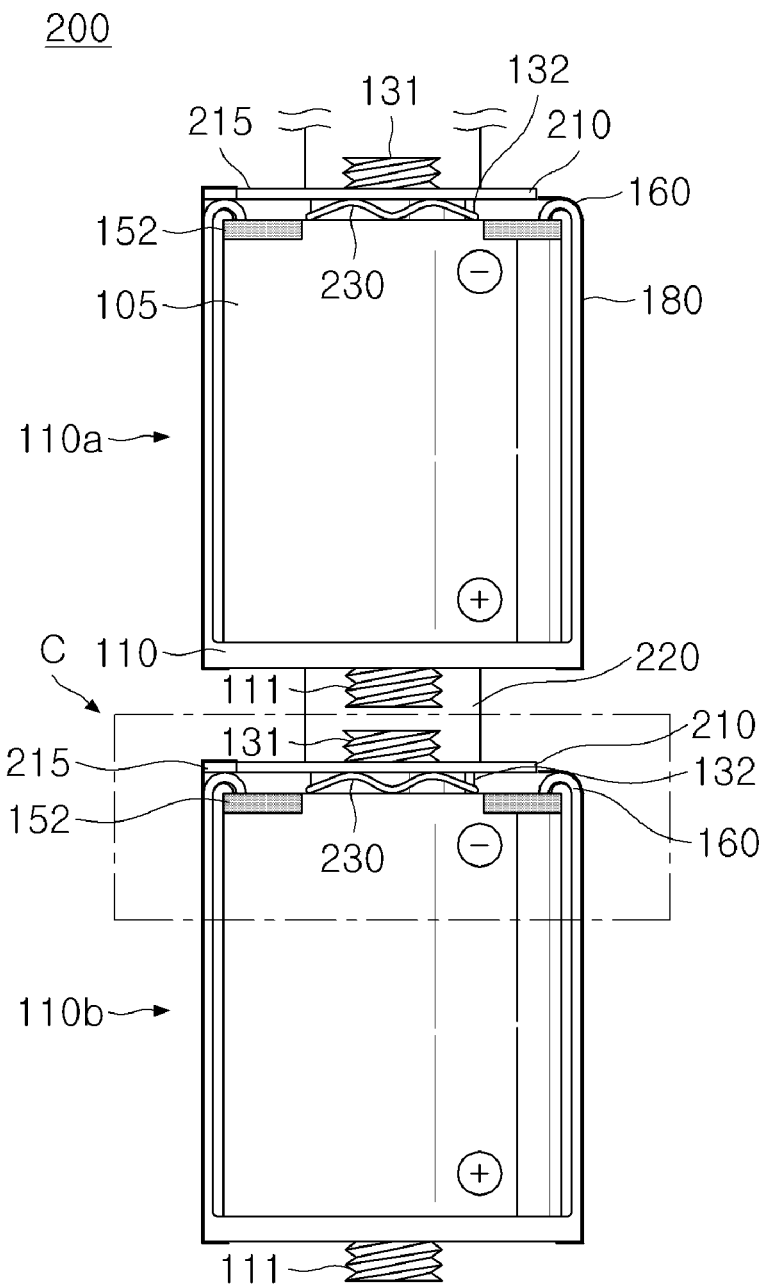

ENERGY STORAGE DEVICE MODULE HAVING A BALANCING CIRCUIT BOARD

PRIORITY STATEMENT

This application claims priorities under 35 U.S.C. § 119 to Korean Patent Application No. 10-2018-0010733 filed on Jan. 29, 2018, and Korean Patent Application No. 10-2018-0150357 filed on Nov. 29, 2018, in the Korean Intellectual Property Office, the entire contents of each hereby incorporated by reference.

FIELD OF TECHNOLOGY

The present disclosure relates to an energy storage device module, and more particularly, to an energy storage device module including a balancing circuit board having a structure that can be electrically connected to a positive terminal and a negative terminal of an energy storage device.

BACKGROUND

Batteries and capacitors are the representative energy storage devices for storing electric energy. Among these capacitors, an ultra-capacitor (UC) is also referred to as a super capacitor (SC) or an electric double layer capacitor (EDLC). The UC is an energy storage device having intermediate characteristics between an electrolytic capacitor and a secondary battery. Due to high efficiency and semi-permanent lifespan characteristics, the UC is regarded as a next generation energy storage device that can be compatible with a secondary battery and can replace a secondary battery.

The UC also used to replace a battery with respect to applications in which maintenance is not easy and long service life is required. Since the UC has fast charge and discharge characteristics, the UC is very suitable for auxiliary power sources for cellular phones, notebooks, and PDAs, which are mobile communication information devices, and main power sources or auxiliary power sources for high-capacity electric vehicles, night road lights, and uninterrupted power supply (UPS). The UC is widely used for such purposes.

In applying such a UC, a high-voltage module of thousands of Farads or hundreds of volts is required so as to use the UC as a high-voltage battery. In the high-voltage module, as many UCs (unit cells) as required are connected in series to constitute a high-voltage UC assembly. In such high-voltage UC modules connected in series, a cell voltage is easily unbalanced during charge, standby, or discharge due to a difference in characteristic factors. This accelerates cell aging and reduces the state-of-charge (SOC) capacity of the module. In addition, some cells may be damaged or exploded due to the overvoltage condition. Therefore, cell balancing is required so as to control the cells.

In order to solve this problem, as illustrated in FIG. 1, an UC module 10 is proposed, which may include a plurality of UCs 11, a plurality of connection members 15 for connecting the UCs 11, and a plurality of balancing circuit boards 17 for controlling the voltages of the UCs 11.

In the UC module 10, negative terminals 13 and positive terminals 12 of the UCs 11 adjacent to each other can be electrically connected via the nut-shaped connection member 15.

Meanwhile, in order to control the voltages of the respective UCs 11 by using the respective balancing circuit boards 17, the respective balancing circuit boards 17 and the respective UCs 11 may be electrically connected to each other. To this end, the UC module 10 of the related art receives a (+) current by connecting one connector 18 combined to one balancing circuit board 17 and another connector 18 combined to another balancing circuit board 17 via a harness (or a wire 19) and receives a (−) current by bringing the respective balancing circuit boards 17 into contact with the respective connection members 15, thereby electrically connecting the respective balancing circuit boards 17 to the respective UCs 11. That is, each of the balancing circuit boards 17 can be electrically connected to the negative terminal 13 of the UC 11 through the nut-shaped connection member 15 and can be electrically connected to the positive terminal 12 of the UC 11 through the harness.

However, in the case of an UC module using a plurality of connectors 18 and a plurality of harnesses 19, an operator may miss the connection of the connector by mistake, and the elastic members 16 may not properly support the balancing circuit boards 17. Thus, a current may not be supplied to the balancing circuit boards 17. In addition, the performance of the UC module may be deteriorated due to heat generated in the plurality of harnesses 19. The harness 19 may be caught between the UCs and thus the covering of the harness 19 may be peeled off or broken. In addition, the manufacturing cost of the UC module may increase due to the plurality of connectors 18 and the plurality of harnesses 19.

SUMMARY

Aspects of the present disclosure may address the above-described problems and other problems. The present disclosure may provide an energy storage device module including a balancing circuit board having a structure that can be electrically connected to a positive terminal and a negative terminal of an energy storage device, without harnesses and connectors.

The present disclosure may also provide an energy storage device module including a balancing circuit board having a cutout structure with a predetermined shape so as to reduce a stress caused by a difference between a point receiving an upward force and a point receiving a downward force.

According to one or more embodiments of the present disclosure, an energy storage device module may include: a plurality of energy storage devices having a first energy storage device and a second energy storage device; a connection member configured to connect a first external terminal of the first energy storage device and a second external terminal of the second energy storage device adjacent to the first energy storage device; and a circuit board including a hole that passes through the first external terminal of the first energy storage device, a board protrusion supported by a curling processed portion formed in a body case of the first energy storage device, a first conductive metal layer formed in a region adjacent to the hole and in contact with the connection member, and a second conductive metal layer formed in a region of the board protrusion and in contact with the curling processed portion.

The foregoing summary is illustrative only and is not intended to be in any way limiting. In addition to the illustrative aspects, embodiments, and features described above, further aspects, embodiments, and features will be apparent by reference to the drawings and the following detailed description.

BRIEF DESCRIPTION OF THE DRAWINGS

The above and other objects, features, and other advantages of the present disclosure will be more clearly understood from the following detailed description taken in conjunction with the accompanying drawings, in which:

FIGS. 3A and 3B are cross-sectional views of an energy storage device module according to an embodiment of the present disclosure;

DETAILED DESCRIPTION

Figure 1:
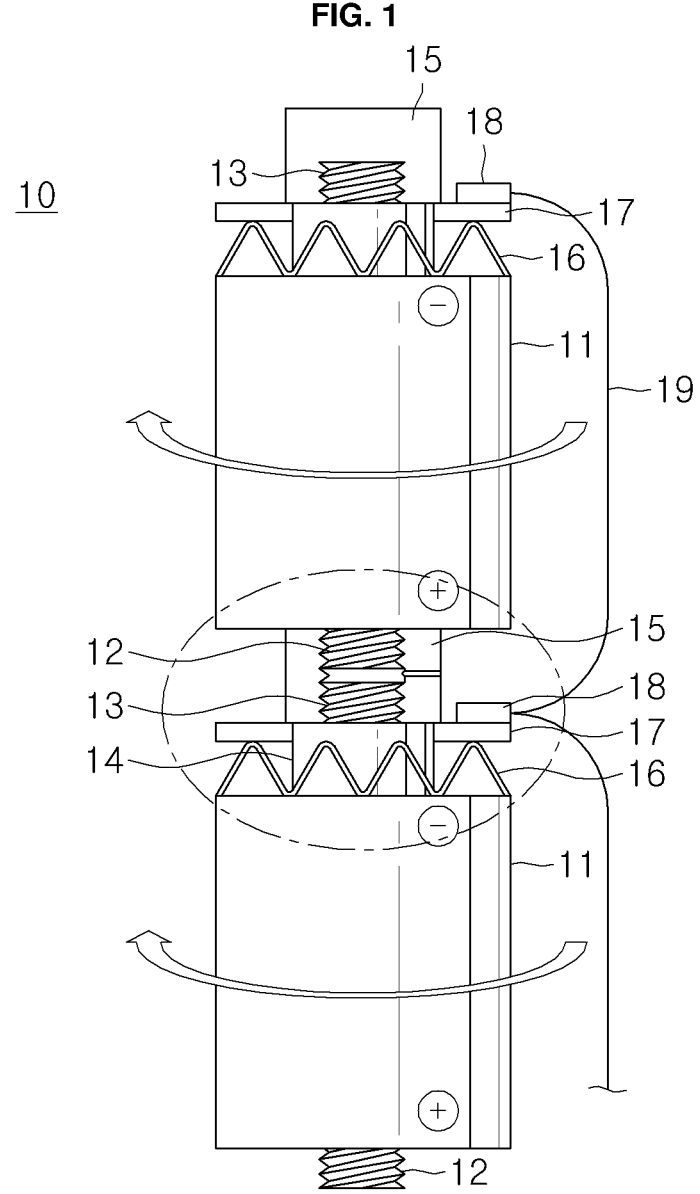
FIG. 1 is a view illustrating an energy storage device module in the related art.

Hereinafter, exemplary embodiments of the present disclosure will be described in detail with reference to the accompanying drawings.

The terms used in the present specification are merely used to describe particular embodiments and are not intended to limit the present disclosure. An expression used in the singular encompasses the expression in the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

It will be understood that although the terms first, second, etc., may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

Also, while describing the present disclosure, detailed descriptions about related well-known functions or configurations that may diminish the clarity of the points of the present disclosure are omitted.

Hereinafter, embodiments of the present disclosure will be described in detail with reference to the accompanying drawings, wherein like reference numerals are used to refer to identical or similar elements, and a redundant description thereof will be omitted. Furthermore, in the following descriptions and the accompanying drawings, descriptions of well-known functions and constructions will be omitted if they are considered to unnecessarily obscure the gist of the present disclosure. The accompanying drawings are provided for easy understanding of the embodiments of the present disclosure, and the technical idea disclosed in this specification is not limited by the accompanying drawings. It is to be understood that the present disclosure is intended to cover all modifications, equivalents, and alternatives falling within the spirit and scope of the invention. In addition, in the accompanying drawings, the size of each element or a specific part constituting the element can be modified for convenience and clarity of description and thus does not entirely reflect the actual size.

The present disclosure provides an energy storage device module including a balancing circuit board having a structure that can be electrically connected to a positive terminal and a negative terminal of an energy storage device, without harnesses and connectors. The present disclosure also provides an energy storage device module including a balancing circuit board having a cutout structure with a predetermined shape so as to reduce a stress caused by a difference between a point receiving an upward force and a point receiving a downward force.

Hereinafter, various embodiments of the present disclosure will be described in detail with reference to the accompanying drawings.

Figure 2:
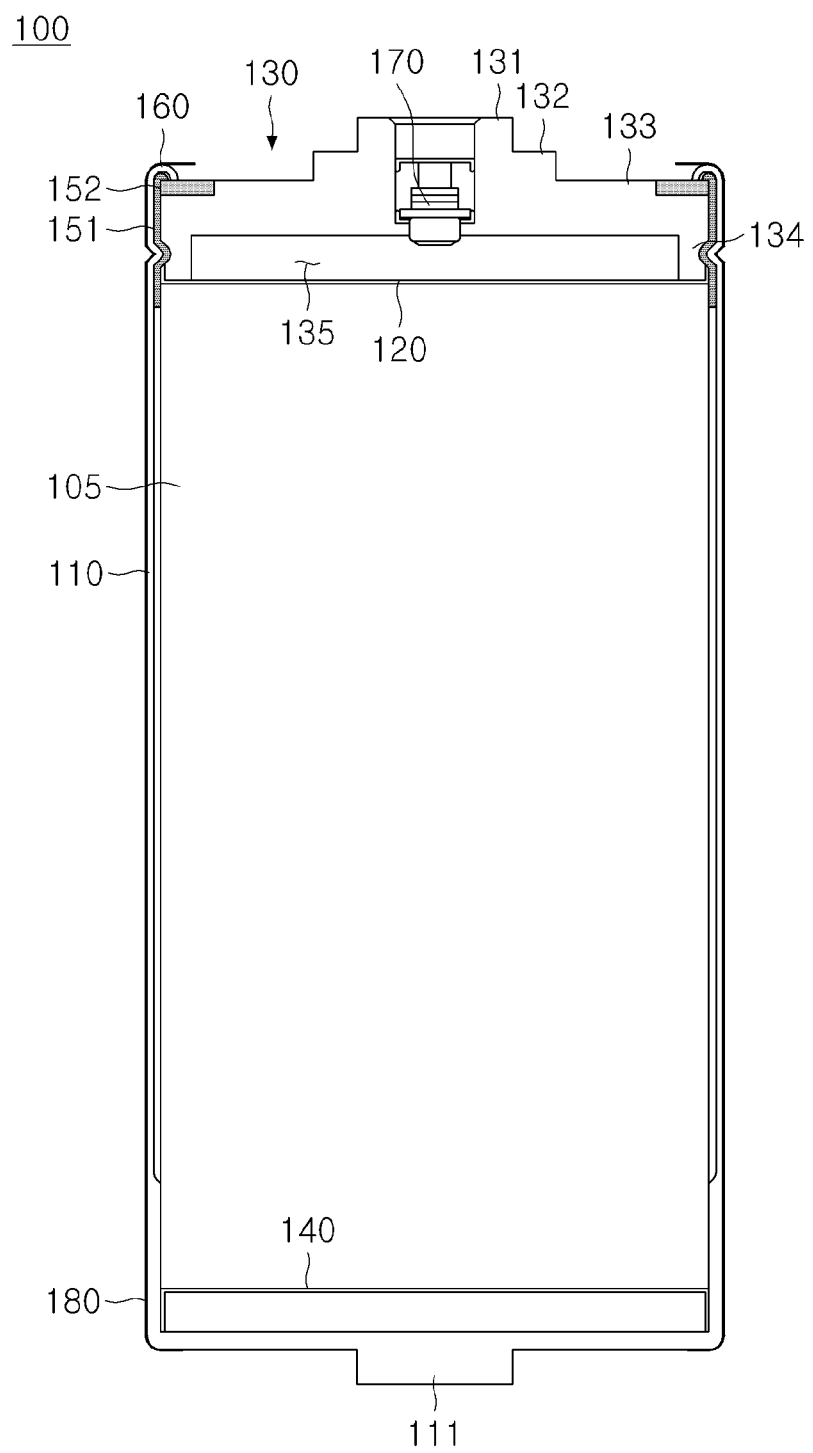
FIG. 2 is a cross-sectional view illustrating an internal configuration of an energy storage device related to the present disclosure.

FIG. 2 is a cross-sectional view illustrating an internal configuration of an energy storage device related to the present disclosure.

Referring to FIG. 2, an energy storage device (or energy storage cell) 100 according to an embodiment of the present disclosure may include a bare cell 105, first and second internal terminals 120 and 140 facing a negative electrode and a positive electrode of the bare cell 105, respectively, a body case 110 accommodating the bare cell 105 and the first and second internal terminals 120 and 140, an upper case 130 covering an upper portion of the body case 110, first and second external terminals 131 and 111 electrically connected to the first and second internal terminals 120 and 140 and formed on an upper surface of the upper case 130 and a lower surface of the body case 110, respectively, and a sleeve member 180 covering at least a part of an outer surface of the body case 110.

The bare cell 105 includes a positive electrode, a negative electrode, a separator, and an electrolyte, and provides an electrochemical energy storage function.

The body case 110 has a cylindrical body in which an accommodation space for accommodating the bare cell 105 processed in the form of a wound element is formed. The cylindrical body may be formed so as to surround the bare cell 105 in a state of being spaced apart by a predetermined distance. In addition, the body case 110 may be formed in an aluminum cylindrical shape.

The body case 110 may include a curling processed portion 160 bent inward from the upper end so as to fix the upper case 130. For example, the curling processed portion 160 may be formed by bending an end portion of the body case 110 so as to have a curved shape. The inner pressure of the body case 110 may be maintained by the curling processed portion 160.

The body case 110 may be integrally formed with the second external terminal 111 electrically connected to the second internal terminal 140. Therefore, the second external terminal 111 electrically connected to the second internal terminal 140, the body case 110, and the curling processed portion 160 may have a positive polarity.

The sleeve member (or the packaging member) 180 corresponding to the outer shape of the body case 110 may be formed on the outer surface of the body case 110. The sleeve member 180 may be formed in the form of a film having a small thickness. The sleeve member 180 may extend from the bottom surface of the body case 110 to the curling processed portion 160.

The second external terminal 111 may protrude downward from the central portion of the lower end of the body case 110. A male screw thread may be formed on the outer circumferential surface of the second external terminal 111.

The upper case 130 is fitted to the upper portion of the body case 110 and coupled to be sealed, and has a plate-shaped structure having a circular outer periphery. For example, the upper case 130 may include an upper plate member 133, a terminal protrusion 132 formed on the upper plate member 133, a first external terminal 131 formed on the terminal protrusion 132, and a coupling protrusion 134 formed below the upper plate member 133. The upper plate member 133, the terminal protrusion 132, the first external terminal 131, and the coupling protrusion 134 may be integrally formed.

The upper plate member 133 may be disposed at the upper portion of the bare cell 105 and may be coupled to the upper portion of the body case 110. The upper plate member 133 may be formed in a circular plate-shaped structure so as to seal an opening formed at the upper portion of the body case 110.

The terminal protrusion 132 may protrude upward from the central portion of the upper plate member 133. For example, the terminal protrusion 132 may be formed in a circular plate-shape structure.

The first external terminal 131 may protrude upward at the central portion of the terminal protrusion 132. The diameter of the first external terminal 131 may be smaller than the diameter of the terminal protrusion 132. A male screw thread may be formed on the outer circumferential surface of the first external terminal 131. In addition, since the first external terminal 131 is integrally formed with the upper plate member 133, the terminal protrusion 132, and the coupling protrusion 134, the first external terminal 131 may be electrically connected to the first internal terminal 120.

The coupling protrusion 134 may protrude downward from the upper plate member 133 and have a circular outer periphery and a concentric circle, and the inside thereof may be opened. At least a part of the coupling protrusion 134 may be in contact with the first internal terminal 120 and electrically connected to the first internal terminal 120. In addition, the coupling protrusion 134 may be inserted into and coupled to a side frame of the first internal terminal 120 so as to provide an internal space 135 between the upper case 130 and the first internal terminal 120.

The upper case 130 may include an insulating member 152 at a portion where the curling processed portion 160 of the body case 110 is positioned. The insulating member 152 may be disposed along the outer circumferential surface of the upper case 130 and may have a circular ring shape. The insulating member 152 may prevent short circuit between the body case 110 electrically connected to the second external terminal 111 and the upper case 130 electrically connected to the first external terminal 131.

The upper case 130 may have a hollow (or a cavity) used as an electrolyte injection path and an air vent for a vacuum operation. A safety valve 170 for discharging the increased pressure in the body case 110 to the outside may be installed in the hollow.

The first internal terminal 120 may be arranged to face the negative electrode of the bare cell 105 in the body case 110, and the second internal terminal 140 may be arranged to face the positive electrode of the bare cell 105 in the body case 110.

The first internal terminal 120 may be disposed at the upper portion of the body case 110, may be electrically connected to the negative electrode of the bare cell 105, may be insulated from the body case 110 by the insulating member 151, may be in contact with the upper case 130, and may be electrically connected to the first external terminal 131 provided at the center of the upper end of the upper case 130.

The second internal terminal 140 may be disposed below the body case 110, may be electrically connected to the positive electrode of the bare cell 105, may be in contact with the body case 110, and may be electrically connected to the second external terminal 111 provided at the center of the lower end of the body case 110.

Meanwhile, in the present disclosure, the case where the first internal terminal 120 and the first external terminal 131 are electrically connected to the negative electrode of the bare cell 105, and the second internal terminal 140 and the second external terminal 111 are electrically connected to the positive electrode of the bare cell 105 has been described, but the present disclosure is not limited thereto. Therefore, it will be apparent to those skilled in the art, that the first internal terminal 120 and the first external terminal 131 are electrically connected to the positive electrode of the bare cell 105, and the second internal terminal 140 and the second external terminal 111 are electrically connected to the negative electrode of the bare cell 105.

Figure 3B:
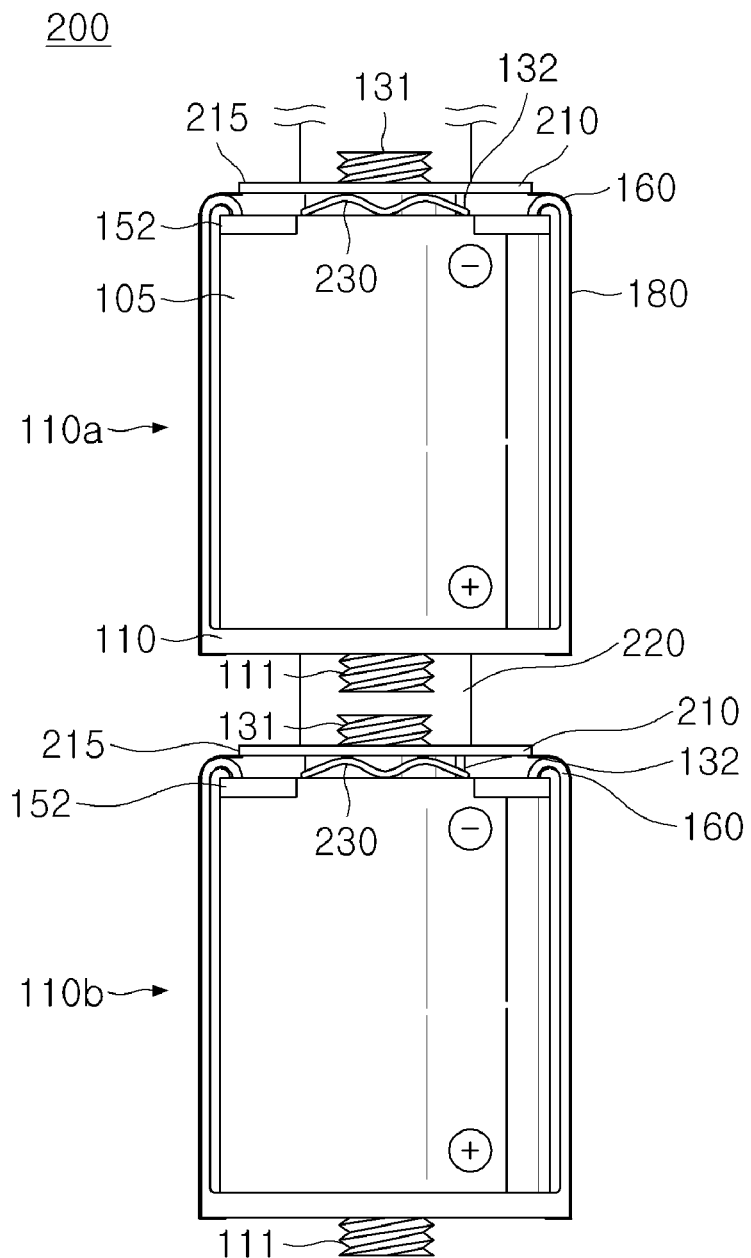
Figure 4:
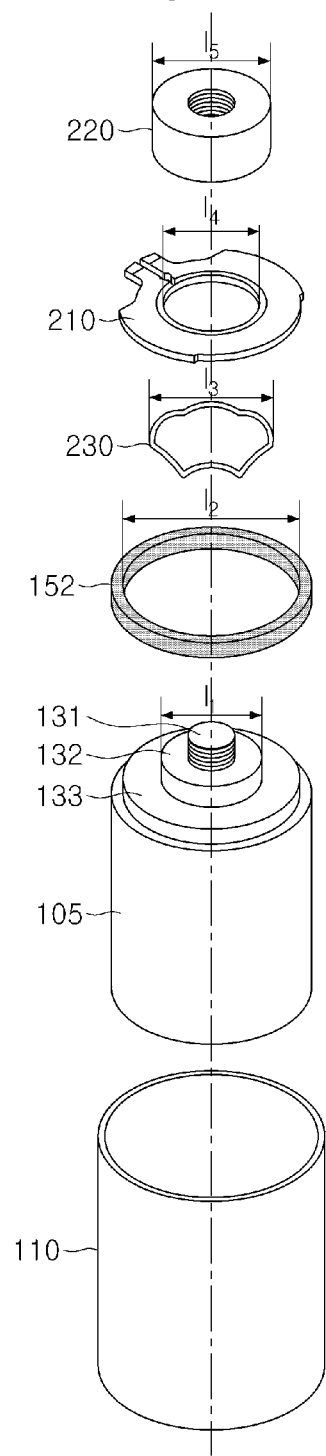
FIG. 4 is an exploded perspective view of the energy storage device module illustrated in FIGS. 3A and 3B.
Figure 5A:
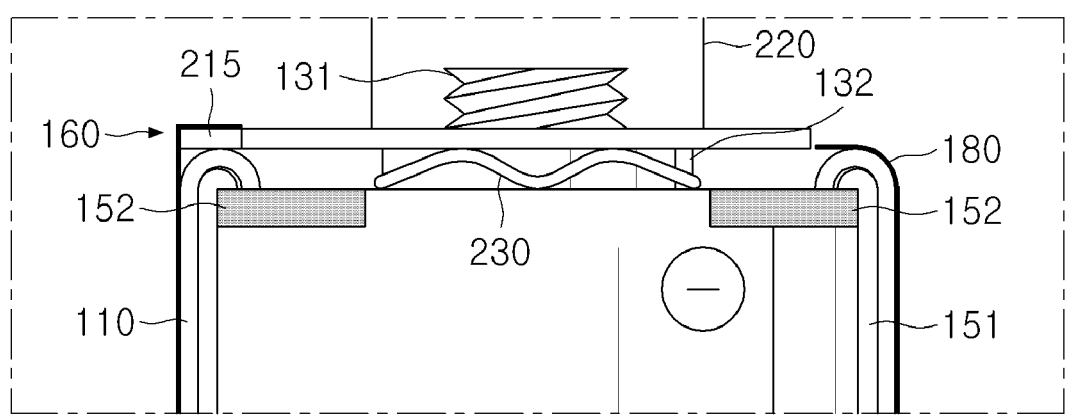
FIG. 5A is an enlarged view of a portion C of the energy storage device module illustrated in FIGS. 3A and 3B.
Figure 5B:
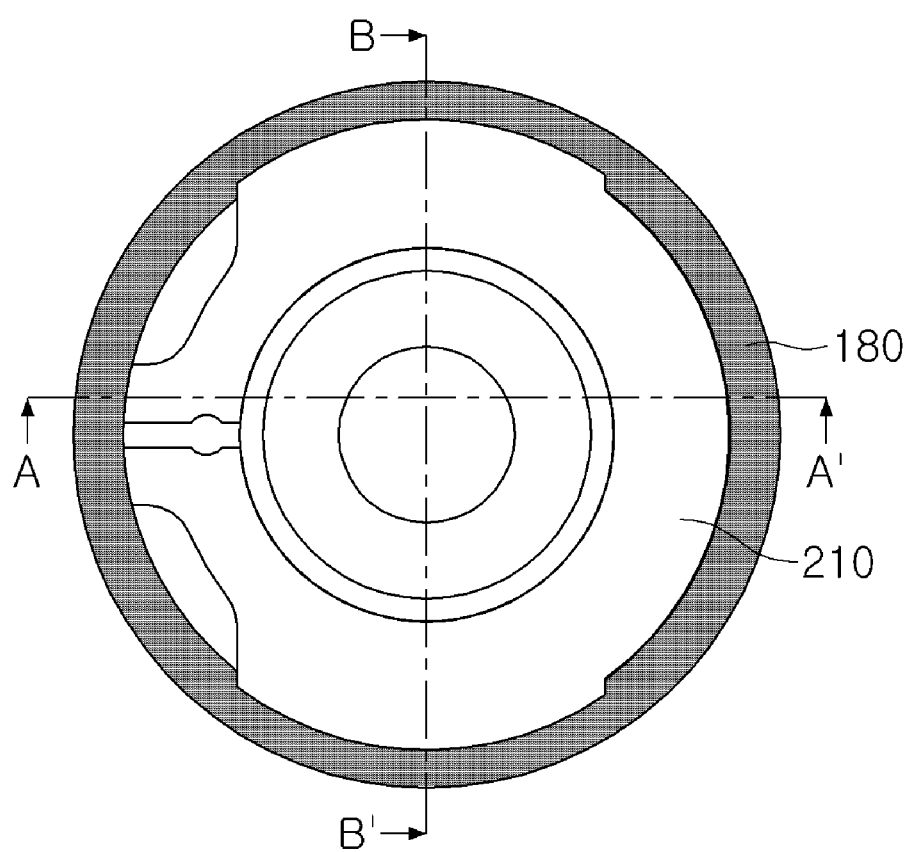
FIG. 5B is a top view of an energy storage device with a balancing circuit board mounted as a part of the energy storage device module illustrated in FIGS. 3A and 3B.
Figure 5C:
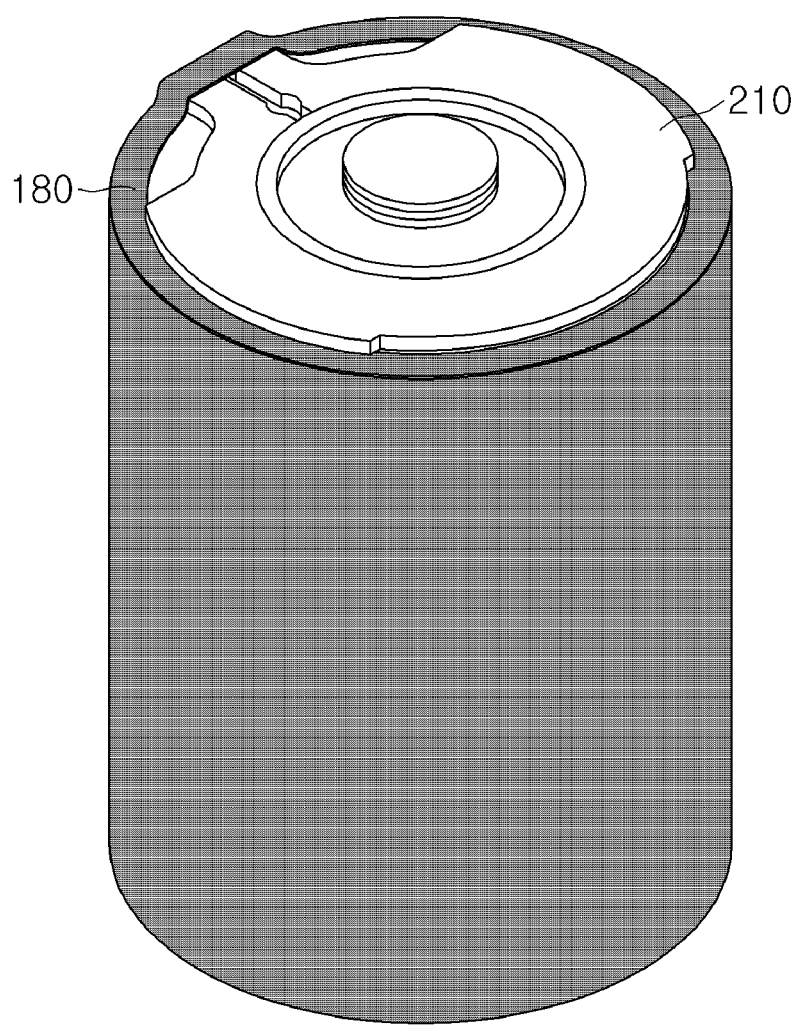
FIG. 5C is a perspective view of the energy storage device with the balancing circuit board mounted as a part of the energy storage device module illustrated in FIGS. 3A and 3B.

FIGS. 3A and 3B are cross-sectional views of an energy storage device module according to an embodiment of the present disclosure, FIG. 4 is an exploded perspective view of the energy storage device module illustrated in FIGS. 3A and 3B, FIG. 5A is an enlarged view of a portion C of the energy storage device module illustrated in FIGS. 3A and 3B, FIG. 5B is a top view of an energy storage device with a balancing circuit board mounted as a part of the energy storage device module illustrated in FIGS. 3A and 3B, and FIG. 5C is a perspective view of the energy storage device with the balancing circuit board mounted as a part of the energy storage device module illustrated in FIGS. 3A and 3B. Here, FIG. 3A is a cross-sectional view of the energy storage device module taken along line A-A' illustrated in FIG. 5B, and FIG. 3B is a cross-sectional view of the energy storage device module taken along line B-B' illustrated in FIG. 5B.

Referring to FIGS. 3A to 5C, an energy storage device module 200 according to an embodiment of the present disclosure may include: a plurality of energy storage devices 100a and 100b, a plurality of balancing circuit boards 210 disposed between the plurality of energy storage devices 100a and 100b, a plurality of connection members 220, and a plurality of elastic members 230.

Since the voltage of each of the energy storage devices 100a and 100b is less than 3V, a plurality of energy storage devices may be connected in series when used in a high-voltage application. In this case, adjacent energy storage devices may be coupled through the connection members 220. That is, the second external terminal 111 formed at the lower portion of the first energy storage device 100a and the first external terminal 131 formed at the upper portion of the second energy storage device 100b are connected to each other by using the connection member 220, thereby connecting the first and second energy storage devices 100a and 100b in series. When a plurality of energy storage devices are connected, the plurality of energy storage devices may be connected in series by repeating the above procedures.

Male screw threads A may be formed on the outer circumferential surfaces of the first and second external terminals 131 and 111 positioned at the upper and lower portions of the energy storage devices 100a and 100b, and female screw threads B having a shape corresponding to the male screw threads A of the first and second external terminals 131 and 111 may be formed on the inner circumferential surface of the connection member 220. The male screw threads A and the female screw threads B may be formed in the same direction.

The second external terminal 111 of the first energy storage device 100a is connected to one side of the connection member 220, and the first external terminal 131 of the second energy storage device 100b is connected to the other side of the connection member 220. Further, they are rotated in the same direction so that the first and second energy storage devices 100a and 100b may be connected to each other in the longitudinal direction in which the first and second external terminals 131 and 111 are formed.

Meanwhile, in another embodiment, the direction of the male screw thread formed in the first external terminal 131 of each of the energy storage devices 100a and 100b may be different from the direction of the male screw thread formed in the second external terminal 111. Therefore, the second external terminal 111 of the first energy storage device 100a is connected to one side of the connection member 220, and the first external terminal 131 of the second energy storage device 100b is connected to the other side of the connection member 220. Then, they are rotated in different directions so that the first and second energy storage devices 100a and 100b may be connected to each other in the longitudinal direction in which the first and second external terminals 131 and 111 are formed.

The connection member 220 may be a metal nut having electrical conductivity and is not necessarily limited thereto. A gas discharge hole (not illustrated) may be formed on one side of the connection member 220. The gas discharge hole may serve to discharge the gas generated during the charge and discharge of the energy storage device 100a to the outside.

The balancing circuit board 210 may be disposed between the connection member 220 and the elastic member 230 and may perform a cell balancing function of controlling the voltage of the cell, that is, the energy storage device 100a. The balancing circuit board 210 may include a circuit portion for performing the cell balancing of the energy storage device 100a. The balancing circuit board 210 may be a printed circuit board (PCB), but is not limited thereto.

A hole, which passes through the first external terminal 131 and the terminal protrusion 132 formed at the upper portion of the energy storage device 100a, may be formed at the central portion of the balancing circuit board 210. The balancing circuit board 210 may be disposed to surround the outer circumferential surface of the terminal protrusion 132 through the hole formed at the central portion. For such an arrangement structure, a diameter $l_4$ of the hole formed at the central portion of the balancing circuit board 210 may be formed to be larger than a diameter $l_1$ of the terminal protrusion 132.

The balancing circuit board 210 may be electrically connected to the curling processed portion 160 of the body case 110 having a positive polarity and may be electrically connected to the first external terminal 131 of the upper case 130 having a negative polarity through the connection member 220.

For example, a first conductive metal layer (not illustrated) may be disposed along the periphery of the hole formed at the central portion of the balancing circuit board 210. The balancing circuit board 210 may be in contact with the lower surface of the connection member 220 through the first conductive metal layer and electrically connected to the first external terminal 131 having a negative polarity. Therefore, the balancing circuit board 210 may receive a negative current from the connection member 220.

A board protrusion 215 for contacting the curling processed portion 160 of the body case 110 may be formed at the peripheral portion of the balancing circuit board 210. Here, the curling processed portion 160 of the body case 110 may be in contact with the lower surface of the board protrusion 215. A second conductive metal layer (not illustrated) may be formed in one region of the board protrusion 215, and may be electrically connected to the body case 110 having a positive polarity through the second conductive metal layer. Therefore, the balancing circuit board 210 may receive a positive current from the body case 110.

The board protrusion 215 of the balancing circuit board 210 may be disposed to be inserted between the curling processed portion 160 of the body case 110 and the sleeve member 180. In this case, due to a force of the sleeve member 180 pressing downward the board protrusion 215 and a force of the curling processed portion 160 supporting upward the board protrusion 215, the board protrusion 215 may be fixed in place even though an external force is applied by the connection member 220 or the like, thereby enhancing a contact force between the board protrusion 215 and the curling processed portion 160.

At least a part of the peripheral portion of the balancing circuit board 210, except for the board protrusion 215, may be disposed on the sleeve member 180. In this case, the balancing circuit board 210 positioned on the sleeve member 180 is subjected to an upward force by the sleeve member 180.

Meanwhile, at least a part of the peripheral portion of the balancing circuit board 210, except for the board protrusion 215, may not be disposed on the sleeve member 180. That is, at least a part of the peripheral portion of the balancing circuit board 210 may be disposed so as not to overlap the sleeve member 180. This is done for reducing the circuit board region that is in contact with the sleeve member 180 so as to reduce the force of the sleeve member 180 pushing up the peripheral portion of the balancing circuit board 210.

Since the balancing circuit board 210 can be connected to the positive electrode and the negative electrode of the energy storage device 100*a*, without harnesses and connectors, the energy storage device module 200 according to the present disclosure can reduce the cost required for providing the harnesses and the connectors, thereby enhancing the market competitiveness of the corresponding module. In addition, the energy storage device module 200 according to the present disclosure can omit the manufacturing process of connecting the harnesses and the connectors to the board, thereby improving the productivity of the corresponding module.

Due to the difference in force (or stress) applied from different points through the curling processed portion 160 of the body case 110, the sleeve member 180, and the connection member 220, the balancing circuit board 210 may be disposed to be horizontal or slightly inclined with respect to the upper surface of the energy storage device 100*a*. That is, the height between the upper surface of the energy storage device 100*a* and the board protrusion 215 may be equal to or slightly higher than the height between the upper surface of the energy storage device 100*a* and the other points of the circuit board 210.

In order to avoid interference between the adjacent energy storage devices 100*a* and 100*b*, the balancing circuit board 210 may be formed to have a diameter equal to or smaller than a diameter of each of the energy storage devices 100*a* and 100*b*.

By providing the elastic member 230, preferably a wave washer, below the balancing circuit board 210, the balancing circuit board 210 may be pushed up toward the connection member 220 by an elastic force of the elastic member 230 and brought into contact with the connection member 220 when the adjacent energy storage devices are coupled by the connection member 220. In order for the balancing circuit board 210 pushed up toward the connection member 220 by the elastic member 230 to come into contact with the connection member 220, a diameter $l_5$ of the connection member 220 may be larger than a diameter $l_4$ of the hole formed at the central portion of the balancing circuit board 210. If the diameter $l_4$ of the hole formed at the central portion of the balancing circuit board 210 is larger than the diameter $l_5$ of the connection member 220, the balancing circuit board 210 is separated from the connection member 220 by the elastic force of the elastic member 230 and is not brought into contact with the connection member 220.

The elastic member 230 may be disposed between the balancing circuit board 210 and the upper plate member 133 and prevent the region around the hole of the balancing circuit board 210 from being excessively bent in the direction of the upper plate member 133. The elastic member 230 may include a hole having a diameter $l_3$ larger than the diameter $l_1$ of the terminal protrusion 132 so as to surround the outer circumferential surface of the terminal protrusion 132. In addition, the elastic member 230 may have a hole having a diameter $l_3$ smaller than a hole diameter $l_2$ of the insulating member 152. In addition, the elastic member 230 may include a hole having a diameter $l_3$ smaller than a hole diameter $l_4$ formed at the central portion of the balancing circuit board 210. Meanwhile, according to various embodiments of the present disclosure, the elastic member 230 may be omitted.

As described above, the energy storage device module according to the embodiment of the present disclosure includes the balancing circuit board having a structure that can be electrically connected to the positive terminal and the negative terminal of the energy storage device, thereby reducing the cost necessary for preparing the harnesses and the connectors and omitting the process of manufacturing the harnesses and the connectors on the board.

Figure 6:
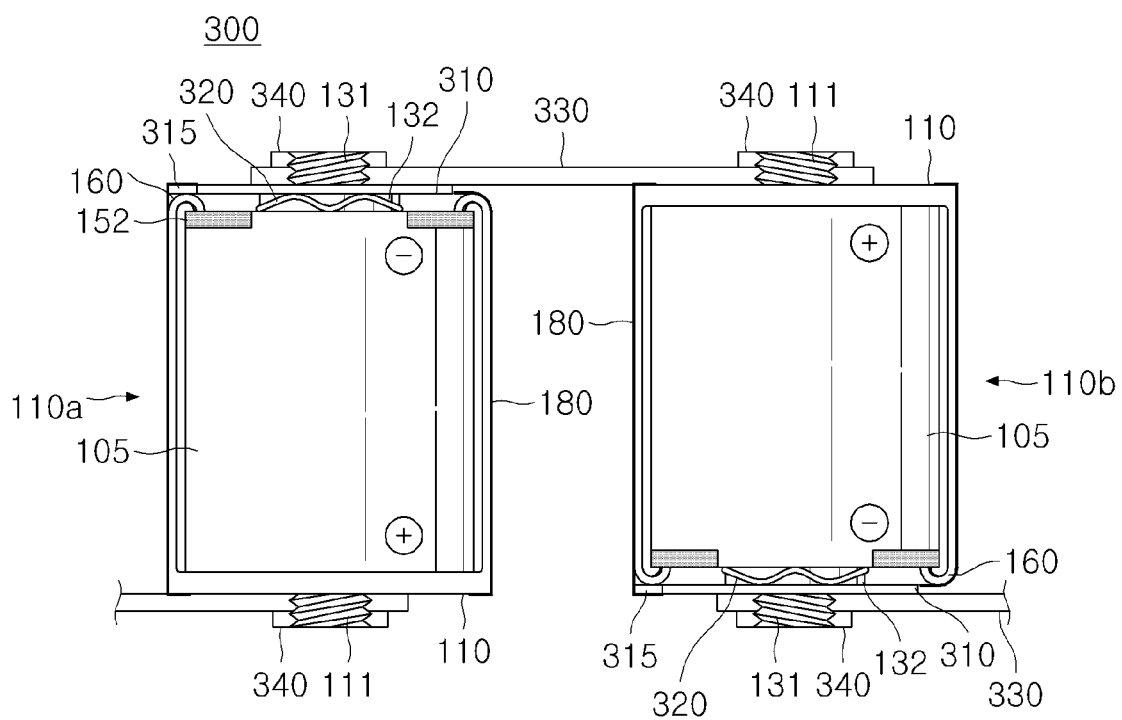
FIG. 6 is a cross-sectional view of an energy storage device module according to another embodiment of the present disclosure.

FIG. 6 is a cross-sectional view of an energy storage device module according to another embodiment of the present disclosure.

The basic configuration of the energy storage device module 300 according to another embodiment of the present disclosure is the same as that of the energy storage device module 200 described above, but the energy storage device module 300 differs from the energy storage device module 200 in terms of the arrangement and connection methods of the energy storage device 100. Hereinafter, for convenience of description, the same reference numerals are used to refer to the same components as those of the energy storage device module 200, and a redundant description thereof will be omitted.

Referring to FIG. 6, an energy storage device module 300 according to another embodiment of the present disclosure may include a plurality of energy storage devices 100*a* and 100*b*, a plurality of balancing circuit boards 310, a plurality of elastic members 320, a plurality of connection members 330, and a plurality of coupling members 340.

The plurality of energy storage devices 100*a* and 100*b* may be spaced apart from each other by a predetermined distance, and may be arranged side by side in the width direction of the energy storage device. Here, a first external terminal 131 of the first energy storage device 100*a* and a second external terminal 111 of the second energy storage device 100*b* adjacent to the first energy storage device 100*a* may be arranged on the same horizontal line.

A connection member (or a bus bar) 330 may electrically connect the first external terminal 131 of the first energy storage device 100*a* and the second external terminal 111 of the second energy storage device 100*b*.

The connection member 330 may have a bar shape and may include a first coupling groove (not illustrated) connectable with the first external terminal 131 of the first energy storage device 100*a* and a second coupling groove (not illustrated) connectable with the second external terminal 111. As illustrated in FIG. 6, the first and second energy storage devices 100*a* and 100*b* may be connected in series by inserting the first external terminal 131 of the first energy storage device 100*a* into the first coupling groove of the connection member 330 and inserting the second external terminal 111 of the second energy storage device 100*b* into the second coupling groove of the connection member 330.

Coupling members 340 are screwed at an upper portion of the first external terminal 131 passing through the first coupling groove of the connection member 330 and an upper portion of the second external terminal 111 passing through the second coupling groove of the connection member 330. Due to this, the detachment of the connection member 330 can be prevented.

The case where the coupling member 340 is used for fixing the connection member 330 has been described in the present disclosure, but the present disclosure is not limited thereto. The connection member 330 may be fixed by welding instead of the coupling member.

The balancing circuit board 310 may be disposed between the connection member 330 and the elastic member 320 and may perform a cell balancing function of controlling the voltage of the cell, that is, the energy storage device 100*a*.

The balancing circuit board 310 may be electrically connected to the curling processed portion 160 of the body case 110 having a positive polarity, and may be electrically connected to the first external terminal 131 of the upper case 130 having a negative polarity through the connection member 330.

The board protrusion 315 of the balancing circuit board 310 may be disposed to be inserted between the curling processed portion 160 of the body case 110 and the sleeve member 180. In this case, due to a force of the sleeve member 180 pressing downward the board protrusion 315 and a force of the curling processed portion 160 supporting upward the board protrusion 315, the board protrusion 315 may be fixed in place even though an external force is applied by the connection member 330 or the like, thereby enhancing a contact force between the board protrusion 315 and the curling processed portion 160.

The elastic member 320 may be disposed between the balancing circuit board 310 and the upper plate member 133 and prevent the central portion of the balancing circuit board 310 from being excessively bent in the direction of the upper plate member 133. Meanwhile, according to the embodiment of the present disclosure, the elastic member 320 may be omitted.

As described above, the energy storage device module according to another embodiment of the present disclosure includes the balancing circuit board having a structure that can be electrically connected to the positive terminal and the negative terminal of the energy storage device, thereby reducing the cost necessary for preparing the harnesses and the connectors and omitting the process of manufacturing the harnesses and the connectors on the board.

Meanwhile, in the energy storage device modules 200 and 300 according to the embodiments of the present disclosure, a certain height difference may occur between the height of the balancing circuit boards 210 and 310 corresponding to the point that is in contact with the curling processed portion 160 of the body case 110 and the height of the balancing circuit boards 210 and 310 corresponding to the point that is in contact with the connection members 220 and 330. This is because the board protrusions 215 and 315 of the balancing circuit boards 210 and 310 are supported by the curling processed portion 160 and receives a force in an upward direction, while the hole peripheral portion of the balancing circuit board 210 receives a force in a downward direction by the connection members 220 and 330.

In order to reduce a stress applied to the balancing circuit board 210 due to the occurrence of the height difference, the shape of the balancing circuit board 210 needs to be changed. Therefore, in the following description, the shapes for effectively dispersing a stress applied to the balancing circuit board 210 will be described in detail.

Figure 7A:
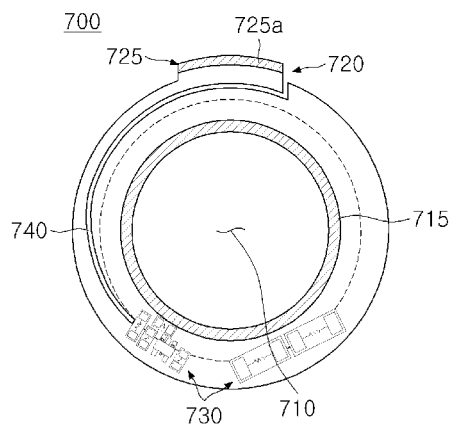
FIGS. 7A to 7C is a view illustrating a shape of a balancing circuit board according to a first embodiment of the present disclosure.
Figure 7B:
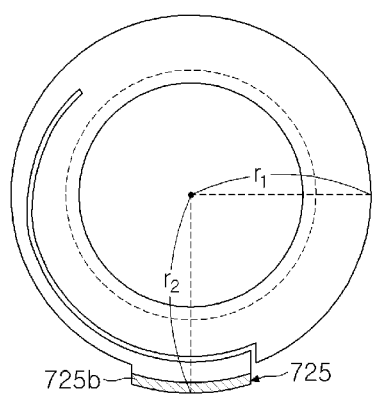
Figure 7C:
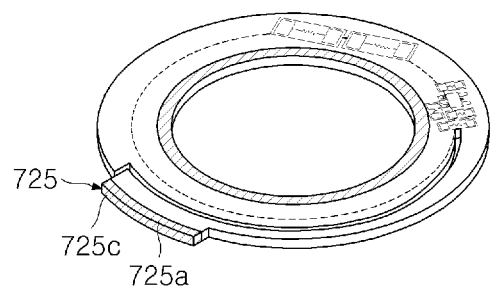

FIGS. 7A to 7C is a view illustrating a shape of a balancing circuit board according to a first embodiment of the present disclosure.

Referring to FIGS. 7A to 7C, a balancing circuit board 700 according to an embodiment of the present disclosure may include: a hole 710 for passing through a first external terminal 131 and a terminal protrusion 132 of an energy storage device 100; a board protrusion 720 protruding from the outer surface of the balancing circuit board 700; a circuit portion 730 for performing cell balancing of the energy storage device 100; and a cutout portion 740 formed by cutting at least a part of the balancing circuit board 700 in a spiral shape.

A first conductive metal layer 715 may be formed in a circular shape along the periphery of the hole 710 formed at the central portion of the balancing circuit board 700. The balancing circuit board 700 may be in contact with the lower surface of the connection member 220 through the first conductive metal layer 715 and electrically connected to the first external terminal 131 having a negative polarity.

A second conductive metal layer 725 may be formed in the board protrusion 720 formed at the peripheral portion of the balancing circuit board 700. For example, the second conductive metal layer 725 may be formed not only on the back surface of the board protrusion 720 but also on the upper surface and the side surface of the board protrusion 720. The second conductive metal layer 725 may include an upper metal layer 725a formed on the upper surface of the board protrusion 720, a lower metal layer 725b formed on the lower surface of the board protrusion 720, and a side metal layer 725c disposed on the side surface of the board protrusion 720.

The balancing circuit board 700 may be in contact with the upper surface of the curling processed portion 160 through the second conductive metal layer 725 and electrically connected to the body case 110 having a positive polarity. In addition, a metal pad (not illustrated) may be further attached to the board protrusion 720 so as to improve the contact area.

The board protrusion 720 of the balancing circuit board 700 may be disposed to be inserted between the curling processed portion 160 of the body case 110 and the sleeve member 180. Due to a force of the sleeve member 180 pressing downward the board protrusion 720 and a force of the curling processed portion 160 supporting upward the board protrusion 720, the board protrusion 720 may be fixed in place even though an external force is applied by the connection members 220 and 330, thereby enhancing a contact force between the board protrusion 720 and the curling processed portion 160. Meanwhile, the peripheral portion of the balancing circuit board 700, except for the board protrusion 720, may be disposed on the sleeve member 180, or may be disposed so as not to overlap the sleeve member 180.

A distance $r_2$ from the center of the balancing circuit board 700 to the edge of the board protrusion 720 may be formed to be larger than a distance $r_1$ from the center of the balancing circuit board 700 to the edge of the balancing circuit board 700, except for the board protrusion 720. That is, a radius $r_2$ of a first circle formed along the outer circumferential surface of the board protrusion 720 may be formed to be larger than a radius $r_1$ of a second circle formed along the outer circumferential surface of the balancing circuit board 700, except for the board protrusion 720.

The circuit portion (or the cell balancing circuit portion) 730 may be electrically connected to the first and second conductive metal layers 715 and 725 through a wiring pattern (not illustrated). The wiring pattern may be formed on the upper surface of the balancing circuit board 700, or may be formed on the back surface of the balancing circuit board 700. The circuit portion 730 is preferably provided on a board region in which the cutout portion 740 is not formed.

The cutout portion 740 may be formed by cutting at least a part of the balancing circuit board 700 in a spiral shape. For example, as illustrated in FIGS. 7A to 7C, the cutout portion 740 may be formed by cutting in a vertical direction along one side surface of the board protrusion 720 and then cutting in a spiral shape by about 180 degrees in a clockwise or counterclockwise direction.

Figure 8A:
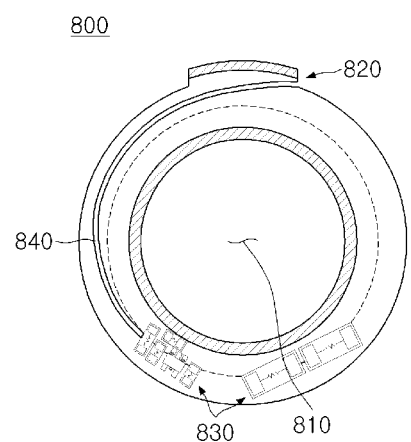
FIGS. 8A to 8C is a view illustrating a shape of a balancing circuit board according to a second embodiment of the present disclosure.
Figure 8B:
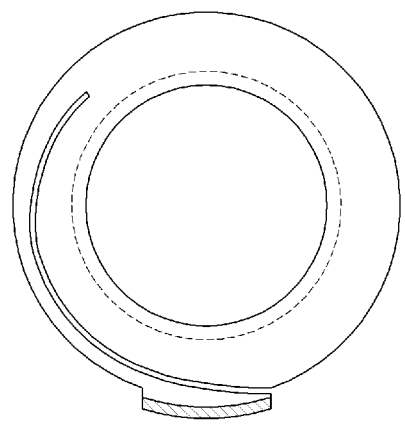
Figure 8C:
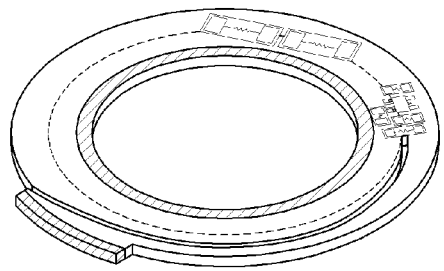

FIGS. 8A to 8C is a view illustrating a shape of a balancing circuit board according to a second embodiment of the present disclosure.

Referring to FIGS. 8A to 8C, a balancing circuit board 800, according to an embodiment of the present disclosure, may include: a hole 810 for passing through a first external terminal 131 and a terminal protrusion 132 of an energy storage device 100; a board protrusion 820 protruding from the outer surface of the balancing circuit board 800; a circuit portion 830 for performing cell balancing of the energy storage device 100; and cutout portion 840 formed by cutting at least a part of the balancing circuit board 800 in a spiral shape.

Since the balancing circuit board 800, according to the present disclosure, is similar to the shape of the balancing circuit board 700 of FIGS. 7A to 7C, the difference will be mainly described. In the present disclosure, a cutout portion 840 may be formed by cutting in a spiral shape by about 180 degrees in a clockwise or counterclockwise direction in a state in which a point where one side surface of a board protrusion 820 and the outer surface of the balancing circuit board 800 meet each other is defined as a start point.

Meanwhile, in the above-described embodiments, the case where the cutout portions 740 and 840 are formed by cutting the balancing circuit boards 700 and 800 in a spiral shape about by 180 degrees has been described, but the present disclosure is not limited thereto. It will be apparent to those skilled in the art that the cutout portions 740 and 840 may be formed by cutting the balancing circuit boards 700 and 800 in a spiral shape by less than or greater than 180 degrees. However, end points of the cutout portions 740 and 840 may be formed so as not to be in contact with the inner surfaces of the balancing circuit boards 700 and 800 so that the balancing circuit boards 700 and 800 are not separated.

In addition, cutout surfaces of the cutout portions 740 and 840 may be spaced apart from each other by a predetermined distance so that friction between the cutout surfaces adjacent to each other does not occur.

Due to the spiral cutout structure, as illustrated in FIGS. 7 and 8, during the process of the energy storage device module 200 and 300, the board protrusions 720 and 820 of the balancing circuit boards 700 and 800 are fixed by the curling processed portion 160, the peripheral portions of the balancing circuit boards 700 and 800 are fixed by the sleeve member 180, and the hole peripheral portions (or central portions) of the balancing circuit boards 700 and 800 are moved in the direction of the upper case 130 (that is, the downward direction) due to the connection members 220 and 330. Therefore, since the force applied to the central portions of the balancing circuit boards 700 and 800 is uniformly dispersed, a stress applied to the balancing circuit boards 700 and 800 can be effectively reduced.

In addition, during the coupling of the connection member and the bus bar, the spiral cutout structure formed in the balancing circuit boards 700 and 800 may serve to disperse the pressures that the upper surfaces of the balancing circuit boards 700 and 800 receive from the connection members and the pressure that the lower surfaces of the balancing circuit boards 700 and 800 receive from the sleeve members. Because a stress applied to the balancing circuit boards 700 and 800 may be reduced, the connection member and the bus bar may be easily coupled at the time of the coupling, and the damage of the balancing circuit boards 700 and 800 may be prevented after the coupling.

Figure 9A:
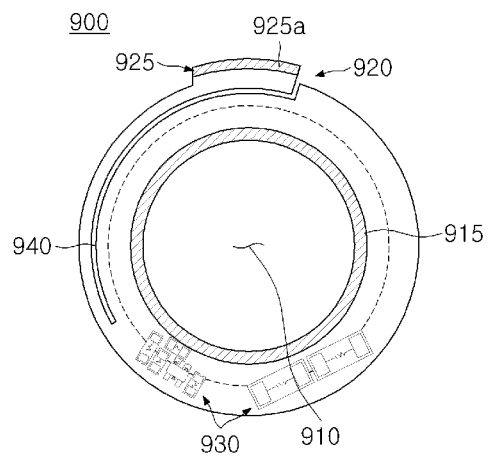
FIGS. 9A to 9C is a view illustrating a shape of a balancing circuit board according to a third embodiment of the present disclosure.
Figure 9B:
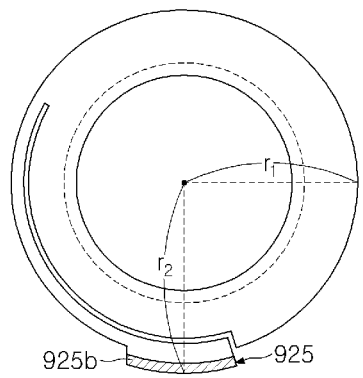
Figure 9C:
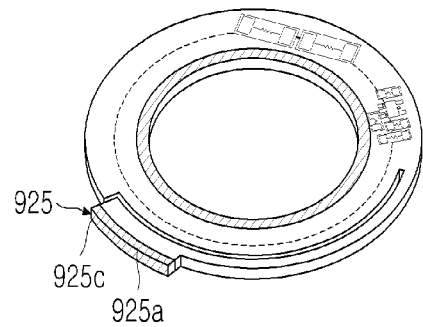

FIGS. 9A to 9C is a view illustrating a shape of a balancing circuit board according to a third embodiment of the present disclosure.

Referring to FIGS. 9A to 9C, a balancing circuit board 900 according to a third embodiment of the present disclosure may include: a hole 910 for passing through a first external terminal 131 and a terminal protrusion 132 of an energy storage device 100; a board protrusion 920 protruding from the outer surface of the balancing circuit board 900; a circuit portion 930 for performing cell balancing of the energy storage device 100; and a cutout portion 940 formed by cutting at least a part of the balancing circuit board 900 in a circular (or arcuate) shape.

A first conductive metal layer 915 may be formed in a circular shape along the periphery of the hole 910 formed at the central portion of the balancing circuit board 900. The balancing circuit board 900 may be in contact with the lower surface of the connection member 220 through the first conductive metal layer 915 and electrically connected to the first external terminal 131 having a negative polarity.

A second conductive metal layer 925 may be formed in the board protrusion 920 formed at the peripheral portion of the balancing circuit board 900. For example, the second conductive metal layer 925 may be formed not only on the back surface of the board protrusion 920, but also on the upper surface and the side surface of the board protrusion 920. The second conductive metal layer 925 may include an upper metal layer 925a formed on the upper surface of the board protrusion 920, a lower metal layer 925b formed on the lower surface of the board protrusion 920, and a side metal layer 925c disposed on the side surface of the board protrusion 920.

The balancing circuit board 900 may be in contact with the upper surface of the curling processed portion 160 through the second conductive metal layer 925 and electrically connected to the body case 110 having a positive polarity.

The board protrusion 920 of the balancing circuit board 900 may be disposed to be inserted between the curling processed portion 160 of the body case 110 and the sleeve member 180. Due to a force of the sleeve member 180 pressing downward the board protrusion 920 and a force of the curling processed portion 160 supporting upward the board protrusion 920, the board protrusion 920 may be fixed in place even through an external force is applied by the connection members 220 and 330, thereby enhancing a contact force between the board protrusion 920 and the curling processed portion 160. Meanwhile, the peripheral portion of the balancing circuit board 900, except for the board protrusion 920, may be disposed on the sleeve member 180, or may be disposed so as not to overlap the sleeve member 180.

A distance $r_2$ from the center of the balancing circuit board 900 to the edge of the board protrusion 920 may be formed to be larger than a distance $r_1$ from the center of the balancing circuit board 900 to the edge of the balancing circuit board 900, except for the board protrusion 920. That is, a radius $r_2$ of a first circle formed along the outer circumferential surface of the board protrusion 920 may be formed to be larger than a radius $r_1$ of a second circle formed along the outer circumferential surface of the balancing circuit board 900, except for the board protrusion 920.

The circuit portion 930 may be electrically connected to the first and second conductive metal layers 915 and 925 through a wiring pattern (not illustrated). The wiring pattern may be formed on the upper surface of the balancing circuit board 900, or may be formed on the back surface of the balancing circuit board 900. The circuit portion 930 is preferably provided on a board region in which the cutout portion 940 is not formed.

The cutout portion 940 may be formed by cutting at least a part of the balancing circuit board 900 in a circular (or arcuate) shape. For example, as illustrated in FIGS. 9A to 9C, the cutout portion 940 may be formed by cutting in a vertical direction along one side surface of the board protrusion 920 and then cutting in a circular (or arcuate) shape by about 120 degrees in a clockwise or counterclockwise direction. Meanwhile, in the present disclosure, the case where the cutout portion 940 is formed by cutting the balancing circuit board 900 by about 120 degrees has been described, but the present disclosure is not limited thereto. It will be apparent to those skilled in the art that the cutout portion 940 may be formed by cutting the balancing circuit board 900 by less than or greater than 120 degrees.

Figure 10A:
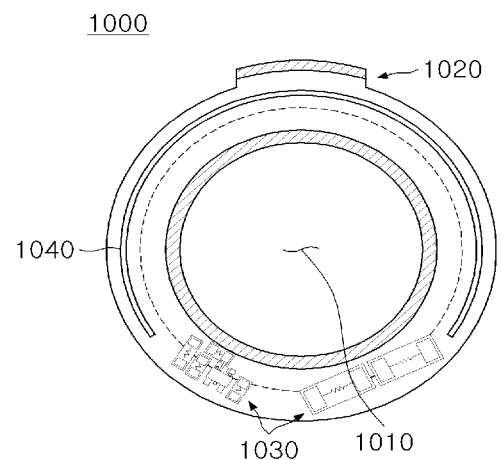
FIGS. 10A to 10C is a view illustrating a shape of a balancing circuit board according to a fourth embodiment of the present disclosure.
Figure 10B:
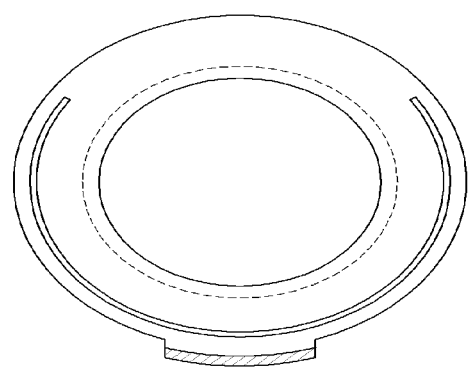
Figure 10C:
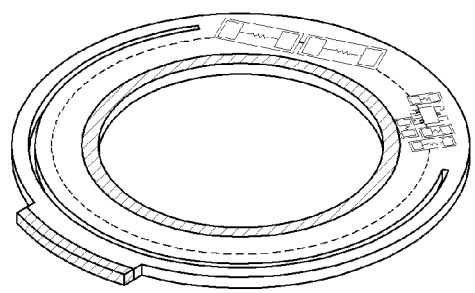

FIGS. 10A to 10C is a view illustrating a shape of a balancing circuit board according to a fourth embodiment of the present disclosure.

Referring to FIGS. 10A to 10C, a balancing circuit board 1000, according to a fourth embodiment of the present disclosure, may include: a hole 1010 for passing through a first external terminal 131 and a terminal protrusion 132 of an energy storage device 100; a board protrusion 1020 protruding from the outer surface of the balancing circuit board 1000; a circuit portion 1030 for performing cell balancing of the energy storage device 100; and a cutout portion 1040 formed by cutting at least a part of the balancing circuit board 1000 in a circular (or arcuate) shape.

Since the balancing circuit board 1000, according to the present disclosure, is similar to the shape of the balancing circuit board 900 of FIGS. 9A to 9C, the difference will be mainly described. In the present disclosure, the cutout portion 1040 may be formed by cutting a board region existing between the inner surface and the outer surface of the balancing circuit board 1000 into a circular shape (or an arcuate shape) by about 300 degrees. Meanwhile, in the present disclosure, the case where the cutout portion 1040 is formed by cutting the balancing circuit board 1000 by about 300 degrees has been described, but the present disclosure is not limited thereto. It will be apparent to those skilled in the art that the cutout portion 1040 may be formed by cutting the balancing circuit board 1000 by less than or greater than 300 degrees. However, an end point of the cutout portion 1040 may be formed so as not to be in contact with a start point of the cutout portion 1040 so that the balancing circuit board 1000 is not separated.

Due to the circular (or arcuate) cutout structure as illustrated in FIGS. 9 and 10, during the process of the energy storage device module 200 and 300, the board protrusions 920 and 1020 of the balancing circuit boards 900 and 1000 are fixed by the curling processed portion 160, the peripheral portions of the balancing circuit boards 900 and 1000 are fixed by the sleeve member 180, and the hole peripheral portions (or central portions) of the balancing circuit boards 900 and 1000 are moved in the direction of the upper case 130 (that is, the downward direction) due to the connection members 220 and 330. Therefore, since the force applied to the central portions of the balancing circuit boards 900 and 1000 is uniformly dispersed, a stress applied to the balancing circuit boards 900 and 1000 can be effectively reduced.

In addition, during the coupling of the connection member and the bus bar, the arcuate cutout structure formed in the balancing circuit boards 900 and 1000 may serve to disperse the pressures that the upper surfaces of the balancing circuit boards 900 and 1000 receive from the connection members and the pressure that the lower surfaces of the balancing circuit boards 900 and 1000 receive from the sleeve members. Because a stress applied to the balancing circuit boards 900 and 1000 may be reduced, the connection member and the bus bar may be easily coupled at the time of the coupling, and the damage of the balancing circuit boards 900 and 1000 may be prevented after the coupling.

Figure 11A:
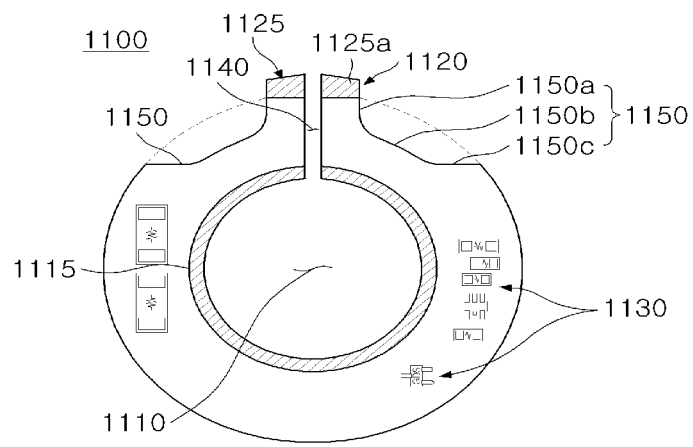
FIGS. 11A to 11C is a view illustrating a shape of a balancing circuit board according to a fifth embodiment of the present disclosure.
Figure 11B:
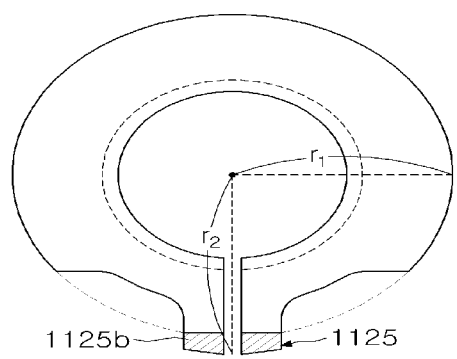
Figure 11C:
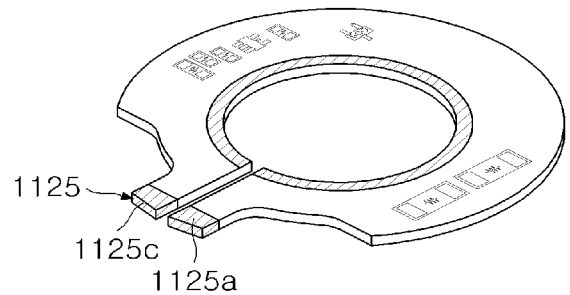

FIGS. 11A to 11C is a view illustrating a shape of a balancing circuit board according to a fifth embodiment of the present disclosure.

Referring to FIGS. 11A to 11C, a balancing circuit board 1100 according to a fifth embodiment of the present disclosure may include: a hole 1110 for passing through a first external terminal 131 and a terminal protrusion 132 of an energy storage device 100; a board protrusion 1120 protruding from the outer surface of the balancing circuit board 1100; a board recess portion 1150 recessed from the outer surface of the balancing circuit board 1100; a circuit portion 1130 for performing cell balancing of the energy storage device 100; and a cutout portion 1040 formed by cutting at least a part of the balancing circuit board 1000 in a vertical direction.

A first conductive metal layer 1115 may be formed in a circular shape along the periphery of the hole 1110 formed at the central portion of the balancing circuit board 1100. The balancing circuit board 1100 may be in contact with the lower surface of the connection member 220 through the first conductive metal layer 1115 and electrically connected to the first external terminal 131 having a negative polarity.

A second conductive metal layer 1125 may be formed in the board protrusion 1120 formed at the peripheral portion of the balancing circuit board 1100. For example, the second conductive metal layer 1125 may be formed not only on the back surface of the board protrusion 1120, but also on the upper surface and the side surface of the board protrusion 1120. The second conductive metal layer 1125 may include an upper metal layer 1125a formed on the upper surface of the board protrusion 1120, a lower metal layer 1125b formed on the lower surface of the board protrusion 1120, and a side metal layer 1125c disposed on the side surface of the board protrusion 1120.

The balancing circuit board 1100 may be in contact with the upper surface of the curling processed portion 160 through the second conductive metal layer 1125 and electrically connected to the body case 110 having a positive polarity.

The board protrusion 1120 of the balancing circuit board 1100 may be disposed to be inserted between the curling processed portion 160 of the body case 110 and the sleeve member 180. Due to a force of the sleeve member 180 pressing downward the board protrusion 1120 and a force of the curling processed portion 160 supporting upward the board protrusion 1120, the board protrusion 1120 may be fixed in place even through an external force is applied by the connection members 220 and 330, thereby enhancing a contact force between the board protrusion 1120 and the curling processed portion 160.

Meanwhile, the peripheral portion of the balancing circuit board 1100, except for the board protrusion 1120, may be disposed on the sleeve member 180. Therefore, the peripheral portion of the balancing circuit board 1100 is supported by the sleeve member 180 and receives an upward force.

A distance $r_2$ from the center of the balancing circuit board 1100 to the edge of the board protrusion 1120 may be formed to be larger than a distance $r_1$ from the center of the balancing circuit board 1100 to the edge of the balancing circuit board 1100, except for the board protrusion 1120. That is, a radius $r_2$ of a first circle formed along the outer circumferential surface of the board protrusion 1120 may be formed to be larger than a radius $r_1$ of a second circle formed along the outer circumferential surface of the balancing circuit board 1100, except for the board protrusion 1120.

The board recess portion 1150 formed adjacent to the board protrusion 1120 of the balancing circuit board 1100 prevents the peripheral portion of the balancing circuit board 1100 and the sleeve member 180 from overlapping each other, so that the board protrusion 1120 can be easily inserted between the curling processed portion 160 and the sleeve member 180.

The board recess portion 1150 may include: a first board connection portion 1150a connected to one side of the board protrusion 1120; a second board connection portion 1150c connected to the circumferential surface of the balancing circuit board 1100, except for the board protrusion 1120; and a board extension portion 1150b extended from one end of the first board connection portion 1150a to one end of the second board connection portion 1150c. Here, the first board connection portion 1150a may extend from one side of the board protrusion 1120 in the inward direction of the balancing circuit board 1100, the second board connection portion 1150c may extend in the outward direction of the balancing circuit board 1100, and the board extension portion 1150b may extend in the circumferential direction of the balancing circuit board 1100.

The circuit portion (or the cell balancing circuit portion) 1130 may be electrically connected to the first and second conductive metal layers 1115 and 1125 through a wiring pattern (not illustrated). The wiring pattern may be formed on the upper surface of the balancing circuit board 1100, or may be formed on the back surface of the balancing circuit board 1100. The circuit portion 1130 is preferably provided on a board region in which the cutout portion 1140 is not formed and a board region which is not in contact with the connection member (for example, bus bar).

The cutout portion 1140 may be formed by cutting at least a part of the balancing circuit board 1100 in a straight-line shape. For example, as illustrated in FIGS. 11A to 11C, the cutout portion 1140 may be formed by cutting the central portion of the board protrusion 1120 in a vertical direction (or a straight-line shape). In this case, the cutout portion 1140 may be formed to penetrate completely between the outer circumferential surface and the inner circumferential surface of the balancing circuit board 1100, or may be formed to penetrate only one of the outer circumferential surface and the inner circumferential surface of the balancing circuit board 1100.

Figure 12A:
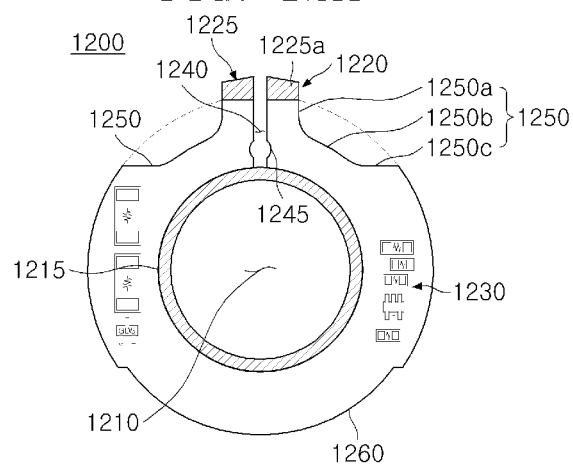
FIGS. 12A to 12C is a view illustrating a shape of a balancing circuit board according to a sixth embodiment of the present disclosure.
Figure 12B:
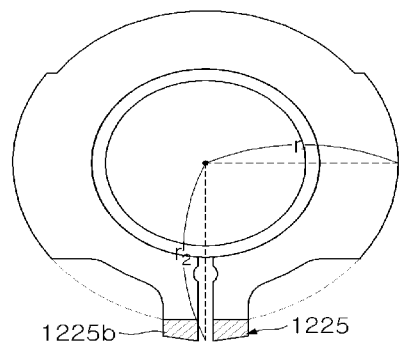
Figure 12C:
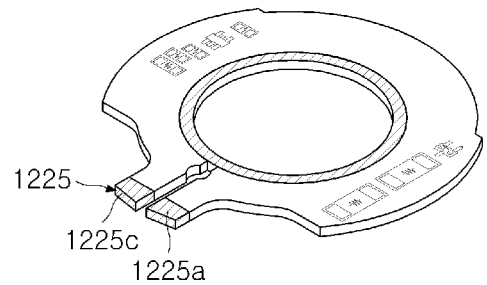

FIGS. 12A to 12C is a view illustrating a shape of a balancing circuit board according to a sixth embodiment of the present disclosure. Meanwhile, FIGS. 5B and 5C are a plan view and a perspective view of the energy storage device with the balancing circuit board of FIGS. 12A to 12C.

Referring to FIGS. 5B, 5C, and 12A to 12C, a balancing circuit board 1200 according to a sixth embodiment of the present disclosure may include: a hole 1210 for passing through a first external terminal 131 and a terminal protrusion 132 of an energy storage device 100; a board protrusion 1220 protruding from the outer surface of the balancing circuit board 1200; a board recess portion 1250 recessed from the outer surface of the balancing circuit board 1200; a height difference forming portion 1260 forming a constant height difference with respect to the outer surface of the balancing circuit board 1200; a circuit portion 1230 for performing cell balancing of the energy storage device 100; and a cutout portion 1240 formed by cutting at least a part of the balancing circuit board 1200 in a vertical direction.

A first conductive metal layer 1215 may be formed in a circular shape along the periphery of the hole 1210 formed at the central portion of the balancing circuit board 1200. The balancing circuit board 1200 may be in contact with the lower surface of the connection member 220 through the first conductive metal layer 1215 and electrically connected to the first external terminal 131 having a negative polarity.

A second conductive metal layer 1225 may be formed in the board protrusion 1220 formed at the peripheral portion of the balancing circuit board 1200. For example, the second conductive metal layer 1225 may be formed not only on the back surface of the board protrusion 1220, but also on the upper surface and the side surface of the board protrusion 1220. The second conductive metal layer 1225 may include an upper metal layer 1225a formed on the upper surface of the board protrusion 1220, a lower metal layer 1225b formed on the lower surface of the board protrusion 1220, and a side metal layer 1225c disposed on the side surface of the board protrusion 1220.

The balancing circuit board 1200 may be in contact with the upper surface of the curling processed portion 160 through the second conductive metal layer 1225 and electrically connected to the body case 110 having a positive polarity.

The board protrusion 1220 of the balancing circuit board 1200 may be disposed to be inserted between the curling processed portion 160 of the body case 110 and the sleeve member 180. Due to a force of the sleeve member 180 pressing downward, the board protrusion 1220, and a force of the curling processed portion 160 supporting upward the board protrusion 1220, the board protrusion 1220 may be fixed in place even through an external force is applied by the connection members 220 and 330, thereby enhancing a contact force between the board protrusion 1220 and the curling processed portion 160.

At least a part of the peripheral portion of the balancing circuit board 1200, except for the board protrusion 1220, may be disposed on the sleeve member 180. Therefore, the peripheral portion of the balancing circuit board 1200 is supported by the sleeve member 180 and receives an upward force.

Meanwhile, if all the peripheral portions of the balancing circuit board 1200, except for the board protrusion 1220, are disposed on the sleeve member 180, the balancing circuit board 1200 receives a large force in the upward direction by the sleeve member 180. Therefore, the screw threads formed on the first and second external terminals 131 and 111 of the energy storage device 100a are collapsed when the energy storage device module 200 is assembled.

In order to solve such a problem, a height difference forming portion 1260 may be provided on at least a part of the peripheral portion of the balancing circuit board 1200. The height difference forming portion 1260 may be formed to be recessed by a predetermined height from the outer surface of the balancing circuit board 1200, so as not to overlap the sleeve member 180. This is done for reducing the circuit board region that is in contact with the sleeve member 180, so as to reduce the force of the sleeve member 180 pushing up the peripheral portion of the balancing circuit board 1200.

The board recess portion 1250 formed adjacent to the board protrusion 1220 of the balancing circuit board 1200 prevents the peripheral portion of the balancing circuit board 1200 and the sleeve member 180 from overlapping each other, so that the board protrusion 1220 can be easily inserted between the curling processed portion 160 and the sleeve member 180.

The board recess portion 1250 may include: a first board connection portion 1250a connected to one side of the board protrusion 1220; a second board connection portion 1250c connected to the circumferential surface of the balancing circuit board 1200, except for the board protrusion 1220; and a board extension portion 1250b extended from one end of the first board connection portion 1250a to one end of the second board connection portion 1250c. Here, the first board connection portion 1250a may extend from one side of the board protrusion 1220 in the inward direction of the balancing circuit board 1200, the second board connection portion 1250c may extend in the outward direction of the balancing circuit board 1200, and the board extension portion 1250b may extend in the circumferential direction of the balancing circuit board 1200.

The circuit portion (or the cell balancing circuit portion) 1230 may be electrically connected to the first and second conductive metal layers 1215 and 1225 through a wiring pattern (not illustrated). The wiring pattern may be formed on the upper surface of the balancing circuit board 1200 or may be formed on the back surface of the balancing circuit board 1200. The circuit portion 1230 is preferably provided on a board region in which the cutout portion 1240 is not formed and a board region which is not in contact with the connection member (for example, bus bar).

The cutout portion 1240 may be formed by cutting a gap between the outer circumferential surface and the inner circumferential surface of the balancing circuit board 1200 in a vertical direction (or a straight-line shape). For example, as illustrated in FIGS. 12A to 12C, the cutout portion 1240 may be formed by cutting the central portion of the board protrusion 1220 in a vertical direction (or a straight-line shape). In this case, the cutout portion 1240 may be formed to penetrate both the outer circumferential surface and the inner circumferential surface of the balancing circuit board 1200, or may be formed to penetrate only the outer circumferential surface.

A fixing groove 1245 into which the protrusion formed in the bus bar is inserted may be formed in one region of the cutout portion 1240. In this case, the shape of the fixing groove 1245 may correspond to the shape of the protrusion formed in the bus bar. The fixing groove 1245 may be coupled to the protrusion of the bus bar and may fix the balancing circuit board 1200 so as not to be moved according to the rotating direction of the coupling member when the energy storage device module 200 is assembled.

As described above, according to at least one of the embodiments of the present disclosure, since the energy storage device module includes the balancing circuit board having a structure that can be electrically connected to the positive terminal and the negative terminal of the energy storage device, it is possible to reduce the cost necessary for preparing the harnesses and the connectors for cell balancing.

In addition, according to at least one of the embodiments of the present disclosure, since the energy storage device module includes the balancing circuit board having a structure that can be electrically connected to the positive terminal and the negative terminal of the energy storage device, it is possible to omit the process of manufacturing the harnesses and the connectors on the board, thereby improving the product productivity.

Furthermore, according to at least one of the embodiments of the present disclosure, since the tension of the balancing circuit board itself is high, excessive force is applied to the connection member and the bus bar, and therefore, the area of the balancing circuit board itself is reduced to reduce the tension, thereby facilitating the assembly of the energy storage device module.

Meanwhile, in the present disclosure, the case where a part of the balancing circuit board is cut in a circular shape, an arcuate shape, a spiral shape, or a straight-line shape has been described, but the present disclosure is not limited thereto. It will be apparent to those skilled in the art that a part of the balancing circuit board may be cut in other various shapes.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore, all changes and modifications that fall within the metes and bounds of the claims, or equivalents of such metes and bounds, are therefore intended to be embraced by the appended claims.

What is claimed is:

1. An energy storage device module comprising:
   a plurality of energy storage devices having a first energy storage device and a second energy storage device;
   a connection member configured to connect a first external terminal of the first energy storage device and a second external terminal of the second energy storage device adjacent to the first energy storage device among the plurality of energy storage devices; and
   a circuit board comprising:
      a hole that passes through the first external terminal of the first energy storage device;
      a board protrusion supported by a curling processed portion formed in a body case of the first energy storage device;
      a first conductive metal layer formed in a region adjacent to the hole and in contact with the connection member; and
      a second conductive metal layer formed in a region of the board protrusion and in contact with the curling processed portion,
      wherein the second conductive metal layer is formed on a lower surface and a side surface of the board protrusion.

2. The energy storage device module of claim 1, wherein the circuit board further comprises a cell balancing circuit portion configured to control a voltage of the first energy storage device.

3. The energy storage device module of claim 1, further comprising an elastic member disposed between the first energy storage device and the circuit board and configured to support the circuit board.

4. The energy storage device module of claim 1, wherein the circuit board is in contact with a lower surface of the connection member through the first conductive metal layer and electrically connected to the first external terminal having a negative polarity.

5. The energy storage device module of claim 1, wherein the circuit board is in contact with an upper surface of the curling processed portion through the second conductive metal layer and electrically connected to the body case having a positive polarity.

6. An energy storage device module comprising:
a plurality of energy storage devices having a first energy storage device and a second energy storage device;
a connection member configured to connect a first external terminal of the first energy storage device and a second external terminal of the second energy storage device adjacent to the first energy storage device among the plurality of energy storage devices; and
a circuit board comprising:
- a hole that passes through the first external terminal of the first energy storage device:
- a board protrusion supported by a curling processed portion formed in a body case of the first energy storage device;
- a first conductive metal layer formed in a region adjacent to the hole and in contact with the connection member;
- a second conductive metal layer formed in a region of the board protrusion and in contact with the curling processed portion; and
- a cutout portion formed by cutting at least a part of the circuit board in a spiral shape.

7. The energy storage device module of claim 6, wherein the cutout portion is formed by cutting in a spiral shape from a point where one side surface of the board protrusion and an outer surface of the circuit board meet each other to a predetermined angle in a clockwise or counterclockwise direction.

8. The energy storage device module of claim 6, wherein the cutout portion is formed by cutting in a vertical direction along one side surface of the board protrusion and then cutting in a spiral shape by a predetermined angle in a clockwise or counterclockwise direction.

9. An energy storage device module comprising:
a plurality of energy storage devices having a first energy storage device and a second energy storage device;
a connection member configured to connect a first external terminal of the first energy storage device and a second external terminal of the second energy storage device adjacent to the first energy storage device among the plurality of energy storage devices; and
a circuit board comprising:
- a hole that passes through the first external terminal of the first energy storage device:
- a board protrusion supported by a curling processed portion formed in a body case of the first energy storage device;
- a first conductive metal layer formed in a region adjacent to the hole and in contact with the connection member;
- a second conductive metal layer formed in a region of the board protrusion and in contact with the curling processed portion; and
- a cutout portion formed by cutting at least a part of the circuit board in an arcuate shape.

10. The energy storage device module of claim 9, wherein the cutout portion is formed by cutting in a vertical direction along one side surface of the board protrusion and then cutting in an arcuate shape by a predetermined angle in a clockwise or counterclockwise direction.

11. The energy storage device module of claim 9, wherein the cutout portion is formed by cutting a board region existing between an inner surface and an outer surface of the circuit board in an arcuate shape by a predetermined angle.

12. An energy storage device module comprising:
a plurality of energy storage devices having a first energy storage device and a second energy storage device;
a connection member configured to connect a first external terminal of the first energy storage device and a second external terminal of the second energy storage device adjacent to the first energy storage device among the plurality of energy storage devices; and
a circuit board comprising:
- a hole that passes through the first external terminal of the first energy storage device:
- a board protrusion supported by a curling processed portion formed in a body case of the first energy storage device;
- a first conductive metal layer formed in a region adjacent to the hole and in contact with the connection member;
- a second conductive metal layer formed in a region of the board protrusion and in contact with the curling processed portion;
- a cutout portion formed by cutting a central portion of the board protrusion in a straight-line shape; and
- a board recess portion disposed adjacent to the board protrusion and recessed from an outer surface of the circuit board.

13. The energy storage device module of claim 12, wherein the cutout portion further comprises a fixing groove combined to a protrusion formed in the connection member so as to fix the circuit board.

14. The energy storage device module of claim 12, wherein the board recess portion comprises:
a first board connection portion connected to one side of the board protrusion;
a second board connection portion connected to a circumferential surface of the circuit board, except for the board protrusion; and
a board extension portion extended from one end of the first board connection portion to one end of the second board connection portion.

15. The energy storage device module of claim 12, wherein the board protrusion is inserted between a sleeve member covering the body case and the curling processed portion.

16. The energy storage device module of claim 15, wherein the circuit board comprises a height difference forming portion recessed from an outer surface of the circuit board, except for the board protrusion, by a predetermined height and disposed so as not to overlap the sleeve member.

17. The energy storage device module of claim 12, wherein a height between an upper surface of the first energy storage device and the board projection is larger than a height between the upper surface of the first energy storage device and other points of the circuit board.

18. The energy storage device module of claim 12, wherein cutout surfaces of the cutout portion are spaced apart from each other by a predetermined distance so that friction between the cutout surfaces does not occur.

* * * * *